(12) United States Patent
Ficara et al.

(10) Patent No.: US 11,877,334 B2
(45) Date of Patent: Jan. 16, 2024

(54) FACILITATING OVER-THE-AIR ADDRESS ROTATION

(71) Applicant: Cisco Technology, Inc., San Jose, CA (US)

(72) Inventors: Domenico Ficara, Essertines-sur-Yverdon (CH); Amine Choukir, Lausanne (CH); Anirban Karmakar, Vaud (CH); Vincent Cuissard, Eteaux (FR); Sudhir Kumar Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 152 days.

(21) Appl. No.: 17/314,609

(22) Filed: May 7, 2021

(65) Prior Publication Data

US 2022/0361269 A1 Nov. 10, 2022

(51) Int. Cl.
*H04W 76/15* (2018.01)
*H04L 12/46* (2006.01)
*H04W 12/037* (2021.01)
*H04L 61/50* (2022.01)
*H04W 84/12* (2009.01)

(52) U.S. Cl.
CPC ......... *H04W 76/15* (2018.02); *H04L 12/4633* (2013.01); *H04L 61/50* (2022.05); *H04W 12/037* (2021.01); *H04W 84/12* (2013.01)

(58) Field of Classification Search
CPC ... H04W 76/15; H04W 12/037; H04W 84/12; H04L 12/4633; H04L 61/50
See application file for complete search history.

(56) References Cited

U.S. PATENT DOCUMENTS 10,237,738 B2    3/2019   Lee et al.
10,454,887 B2   10/2019   Weis et al.
(Continued)

FOREIGN PATENT DOCUMENTS

DE    102015204210 A1    9/2016
EP       1379029 A1    1/2004
(Continued)

OTHER PUBLICATIONS

Ansley et al., "Proposal for New Action Frame to Aid Mac Randomization Handling," IEEE 802.11-19/0179r3, Jul. 2019, 9 pages.
(Continued)

*Primary Examiner* — Charles C Jiang
*Assistant Examiner* — Shawn D Miller
(74) *Attorney, Agent, or Firm* — Edell, Shapiro & Finnan, LLC

(57) ABSTRACT

A wireless client device communicates, to an access point over a secure channel, a mapping of a dynamic device address to a stable device address. By communicating the mapping, the access point is able to determine that packets received from two different device addresses originate from a common device. The access point is then able to maintain an association between the originating device and other network resources assigned or allocated to the originating device, such as IP addresses or infrastructure station address, which is used to identify the originating device to other devices outside the network in some embodiments.

20 Claims, 14 Drawing Sheets

(56) References Cited

U.S. PATENT DOCUMENTS

| | | | |
|---|---|---|---|
| 10,820,202 | B1 | 10/2020 | Gundavelli |
| 2012/0213211 | A1 | 8/2012 | Remaker |
| 2014/0064184 | A1* | 3/2014 | Cherian ................ H04W 48/16 370/328 |
| 2015/0063205 | A1 | 3/2015 | Elliott |
| 2016/0135041 | A1* | 5/2016 | Lee ...................... H04L 45/745 726/3 |
| 2016/0261602 | A1* | 9/2016 | Glassco ................ H04L 9/0866 |
| 2016/0269359 | A1 | 9/2016 | Adrangi et al. |
| 2016/0302058 | A1 | 10/2016 | Mestanov et al. |
| 2017/0142064 | A1 | 5/2017 | Weis et al. |
| 2017/0208002 | A1* | 7/2017 | Bittles ..................... H04L 45/72 |
| 2018/0324142 | A1 | 11/2018 | Adrangi et al. |
| 2019/0238501 | A1* | 8/2019 | Chuu ..................... H04L 69/22 |
| 2019/0386955 | A1 | 12/2019 | Weis et al. |
| 2020/0244655 | A1 | 7/2020 | Gundavelli et al. |
| 2021/0036988 | A1 | 2/2021 | McKibben et al. |

FOREIGN PATENT DOCUMENTS

| | | | |
|---|---|---|---|
| EP | 1732265 | A1 | 12/2006 |
| WO | 2016/114843 | A2 | 7/2016 |
| WO | 2020000430 | A1 | 1/2020 |
| WO | 2020/010126 | A1 | 9/2020 |

OTHER PUBLICATIONS

Marks, "IEEE Std 802c: What's New and Useful in the Overview and Architecture," IEEE 802.1 Contribution, Sep. 2017, 42 pages.

Slashdot, "Did MacOS Stop Allowing Changes to Wifi MAC Addresses?," https://mobile.slashdot.org/story/19/10/06/177216/did-macos-stop-allowing-changes-to-wifi-mac-addresses, Apr. 5, 2021, 8 pages.

Volz, et al., "Link-Layer Addresses Assignment Mechanism for DHCPv6," draft-bvtm-dhc-mac-assign-02, Dynamic Host Configuration (DHC), Internet-Draft, Oct. 20, 2018, 18 pages.

Lee, et al., "Problem Statements for MAC Address Randomization," draft-lee-randomized-macaddr-ps-01 Internet Engineering Task Force, Internet-Draft, Sep. 22, 2020, 6 pages.

Ansley, "IEEE P802.11—Randomized and Changing MAC Address (RCM) Study Group (SG)—Meeting Update," https://www.ieee802.org/11/Reports/rcmtig_update.htm, Apr. 5, 2021, 2 pages.

Stretch, "MAC Address Aggregation and Translation as an Alternative to L2 Overlays," https://packetlife.net/blog/2014/nov/18/mac-address-aggregation-and-translation/, Nov. 18, 2014, 9 pages.

Wang, et al., "MAC Address Translation for Enabling Scalable Virtual Private LAN Services?," 21st International Conference on Advanced Information Networking and Applications Workshops (AINAW'07), May 2007, 6 pages.

Android Open Source Project, "Privacy: MAC Randomization," retrieved from https://source.android.com/devices/tech/connect/wifi-mac-randomization, on Dec. 4, 2020, 4 pages.

Bellovin et al., "Privacy-Enhanced Searches Using Encrypted Bloom Filters," Columbia University Computer Science Technical Reports, CUCS-034-07, Apr. 27, 2011, 16 pages.

Razaque, et al., "Restoring the privacy and confidentiality of users over Mobile collaborative learning (MCL) environment," IEEE Transaction Latin America, vol. 9, No. 7, Dec. 2011, 13 pages.

Alibaba Cloud, "The principle of Arp-nat (MAC Address translation)," https://topic.alibabacloud.com/a/the-principle-of-arp-nat-mac-address-translation_8_8_30147619.html, Nov. 2017, 7 pages.

Wi-Fi Alliance, "WPA3™ Specification," Version 3, WPA3™ Specification Version 3.0, https://www.wi-fi.org/file/wpa3-specification, Dec. 20, 2019, 30 pages.

Michael Montemurro, "MAC Address Change," IEEE P802.11, Wireless LANs, doc.: IEEE 802.11-19/2024r1, Nov. 11, 2019, 4 pages.

"Part 11: Wireless LAN Medium Access Control (MAC) and Physical Layer (PHY) Specifications—Amendment 5: Preassociation Discovery," IEEE Standard for Information technology—Telecommunications and information exchange between systems—Local and metropolitan area networks—Specific requirements, IEEE Computer Society, IEEE Std 802.11aq™-2018, Jun. 14, 2018, 69 pages.

International Search Report and Written Opinion in International Application No. PCT/US2021/031684, dated Jul. 5, 2021, 16 pages.

Frank Ciotti, et al., "TGi Dallas Interim Meeting Minutes—Jan. 2002," LinCom Wireless, Wireless LANs, doc.: IEEE 802.11-02/028r0, Jan. 21-25, 2002, 34 pages.

"Amendment 2: Local Medium Access Control (MAC) Address Usage," IEEE Standards Association, IEEE Standard for Local and Metropolitan Area Networks: Overview and Architecture, IEEE Std 802c™-2017, 26 pages.

"Part 11: Wireless LAN Medium Access Control (MAC) and Physical Layer (PHY) specifications—Amendment 6: Medium Access Control (MAC) Security Enhancements," IEEE Standard for Information technology—Telecommunications and information exchange between systems—Local and metropolitan area networks Specific requirements, IEEE Std 802.11i™-2004, Jul. 23, 2004, 190 pages.

* cited by examiner

FACILITATING OVER-THE-AIR ADDRESS ROTATION

TECHNICAL FIELD

The present disclosure relates to device address rotation on a wireless network.

BACKGROUND

In an effort to improve privacy of a mobile device user, many mobile operating system vendors are periodically changing (or "rotating") a device address (e.g. a station address) used to identify a mobile device on a wireless network. By changing the device address, it can be more difficult for an eavesdropper to not only track a location of a mobile device user, but also, in some circumstances, monitor their online activities. While rotation of a wireless device's address can improve privacy, much of the legacy wireless network infrastructure was not designed to accommodate such address rotation, and in many cases, uses the device address as an identifier of the station for a variety of processing.

DESCRIPTION OF EXAMPLE EMBODIMENTS

Overview

Figure 1:
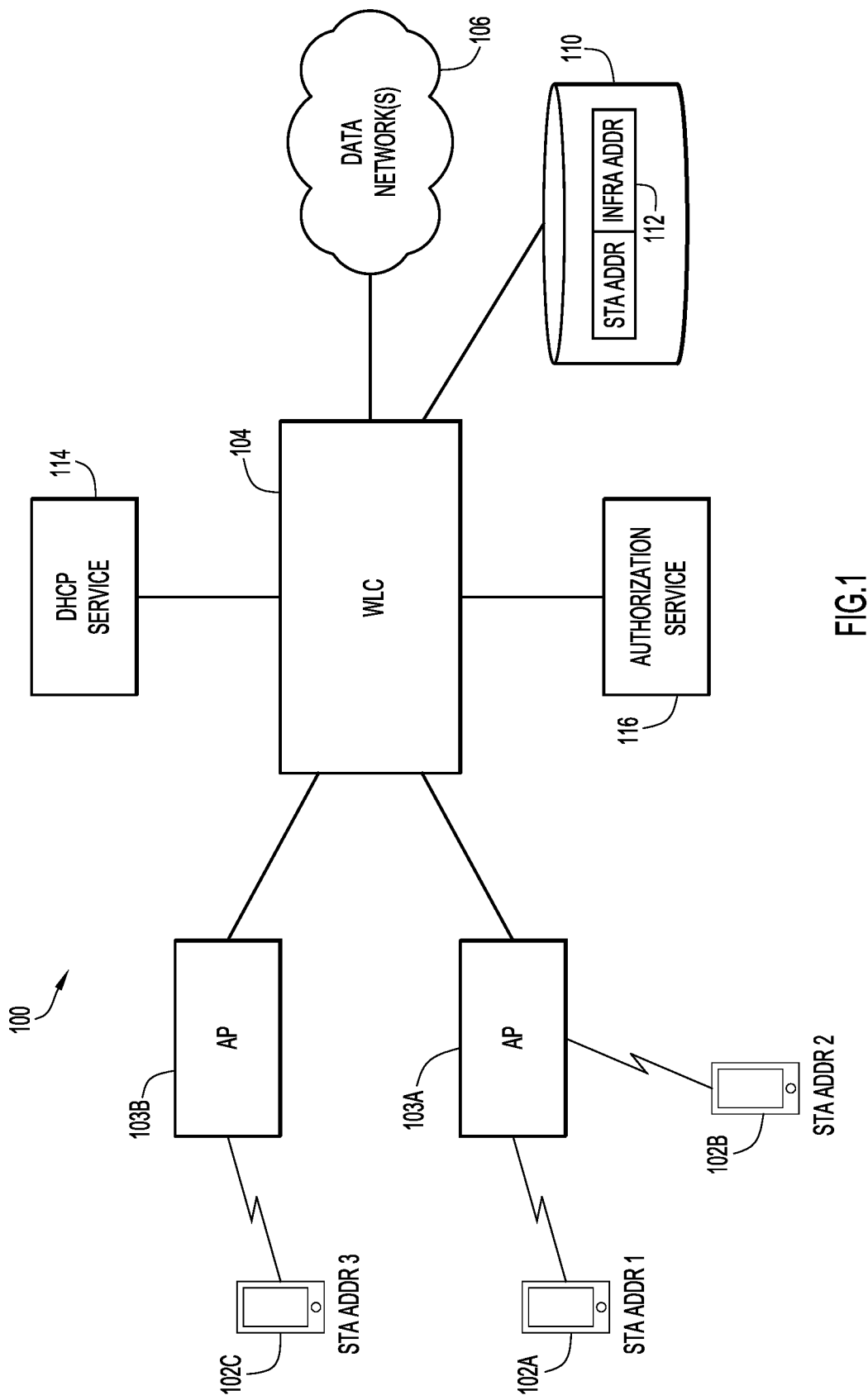
FIG. 1 is an overview diagram of a system that provides for rotation of device addresses in accordance with one or more of the disclosed embodiments.

One aspect disclosed herein is a method performed by a wireless access point device, wireless network controller or other similar device to enabling rotation of a wireless client address. The method includes associating a wireless client device that is identified via a first device address; establishing, based on the associating, a first secure communication channel with the wireless client device; receiving, over the first secure communication channel, a first mapping of the first device address to a stable device address; performing first data communication with the wireless client device based on the first mapping; second associating the wireless client device, the wireless client device identified via a second device address; establishing a second secure communication channel with the wireless client device; receiving, over the second secure communication channel, a second mapping of the second device address to the stable device address; and performing second data communication with the wireless client device based on the second mapping.

Example Embodiments

Presented herein are embodiments generally direct to rotating a device address of a mobile wireless client device or wireless station (STA). As discussed above, while address rotation can improve the privacy of a mobile device user, legacy wireless network infrastructure was not necessarily designed to accommodate a mobile device address that changes over time. Thus, the disclosed embodiments provide for communicating a mapping of a station's OTA device address to a stable identifier, such as a stable device address (e.g. a stable Media Access Control (MAC) address. Thus, when a station rotates its OTA address from a first OTA device address to a second OTA device address, both device addresses map to a common stable identifier. This allows the wireless network infrastructure to identify that both OTA device addresses identify a common STA.

In some embodiments, after the mapping is communicated, the STA and access point (AP) or wireless local area network (LAN) controller (WLC) communicate by establishing a secure tunnel that identifies the STA via a device address that is subject to rotation. The secure tunnel encapsulates a set of second packets that identify the STA via a stable device address. The second packets, when received by the AP from the STA, and forwarded to other devices as appropriate, identify the STA via the stable device address. Similarly, when the AP sends data to the STA, a second packet identifying the STA via the stable device address is forwarded to the STA by encapsulating it in a frame that identifies the STA via its current OTA device address (that is subject to rotation).

In some embodiments, the mapping between the OTA device address and the stable device address is communicated to the AP via an action request frame. Some of the embodiments that utilize the secure tunnel discussed above, communicate a request to establish the tunnel via an action frame as well.

FIG. 1 is an overview diagram of a system 100 that provides for rotation of device addresses in accordance with one or more of the disclosed embodiments. FIG. 1 shows a wireless station (STA) during three different time periods, shown as STA 102A, STA 102B, and STA 102C. At each of the time periods, the STA is utilizing a different device address (e.g. address 1, address 2, and address 3). The STA associates with an access point (AP), such as the AP 103A or the AP 103B. Each of the AP 103A and the AP 103B interfaces with a wireless LAN controller (WLC) 104. The WLC 104 provides access to a data network 106. The WLC 104 also provides connectivity to a Dynamic Host Configuration Protocol (DHCP) protocol service 114 and an authorization/authentication service 116. In some embodiments, the WLC 104 maintains a mapping between an OTA device address in use by the STA 102A, STA 102B, or STA 102C, and an infrastructure address, which is used to identify the STA to network components not communicating with the STA via the wireless network. For example, in some embodiments, the WLC 104 translates a destination address of a packet inbound from the data network 106 from an infrastructure station address identifying the STA to an OTA device address in present use by the STA 102A, STA 102B, or STA 102C. This mapping is stored by the WLC 104 in a configuration data store 110, which includes a mapping 112 of infrastructure address (stable device address) to STA address (OTA device address).

Figure 2:
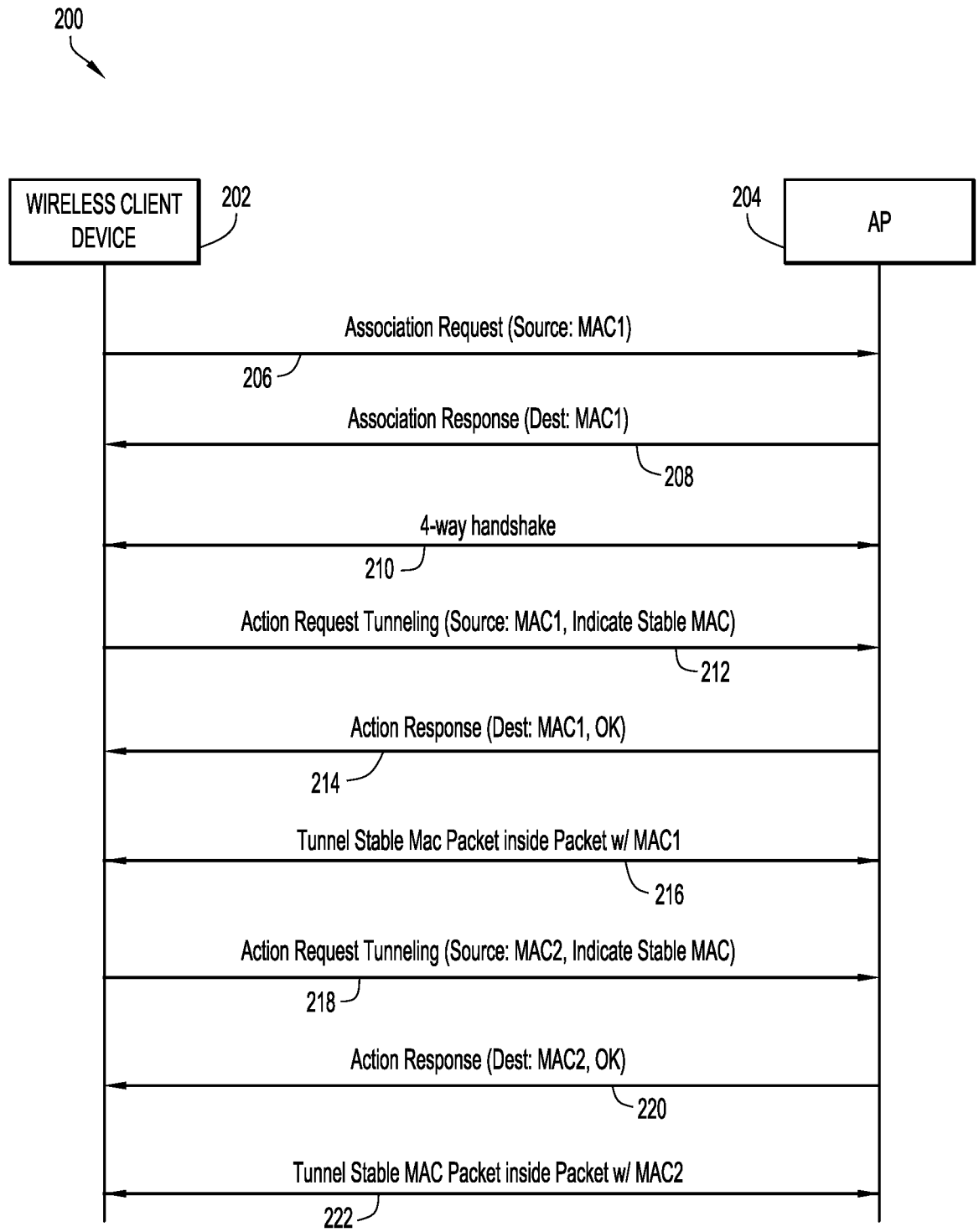
FIG. 2 is a sequence diagram showing device address rotation in accordance with an example embodiment.

FIG. 2 is a sequence diagram showing device address rotation in accordance with an example embodiment. FIG. 2 shows an approach to MAC address rotation that implements a tunnel between a STA and an ATP. Tunnel packets identify the STA via an OTA device address that is subject to rotation. The tunnel carries packets that identify the STA via a stable device address.

FIG. 2 shows a message exchange 200 between an STA (also called wireless client device) 202 in communication with an AP 204. The STA transmits an association request message 206 to the AP 204. The STA identifies itself in the association request message 206 (e.g. in an Institute of Electrical and Electronic Engineers (IEEE) 802.11 standard frame header) via a first device address (e.g., "MAC1"). The AP transmits an association response message 208. The association response message indicates a successful association between the STA 202 and the AP 204, and identifies the STA 202 via the first device address in a destination address field of a header of the association response message 208 (e.g. an 802.11 standard frame header). The STA 202 and AP 204 then perform a 4-way handshake to complete an authentication between the two devices.

As the STA seeks to rotate its device address, the STA transmits an action request frame 212 to the AP 204. The action request frame 212 indicates a request to utilize tunneling for communication between the STA 202 and the AP 204. The action request frame 212 indicates a mapping between the first device address (e.g., "MAC1") and a stable device address. In some embodiments, the stable device address is a device address assigned to the STA by its manufacturer. Upon receiving the action request frame 212, the AP records a mapping between the first device address and the stable device address indicated in the action request frame 212. The AP then transmits an action response frame 214, indicating the request for tunneling is approved.

The STA 202 and AP 204 then exchange data frames 216 via the tunnel. As discussed above, the tunnel relies on the first OTA device address to identify the station on the wireless network. Upon receiving a tunnel frame, the AP 204 is able to decrypt the contents of the packet as the STA 202 and AP 204 share key information exchanged during the 4-way handshake 210. Upon decrypting the contents of the tunnel frame, a second frame is identified by the AP. The second frame identifies the STA 202 via the stable device address. The AP 204 is then able to forward the embedded frame on (e.g., over the data network 106).

The STA then initiates an additional rotation of its device address, and transmits an action request message 218 requesting a new tunnel. The action request frame is sent identifying the STA view a second device address ("MAC2"). The AP 204 acknowledges the request by transmitting an action response frame 220. The action response frame 220 identifies the STA 202 via a destination address indicating the second device address.

After the action response frame 220 is received, a new tunnel is established between the STA 202 and the AP 204. The second OTA device address identifies the STA in a tunnel packet 222 sent to or from the STA 202. Encapsulated inside the tunneled frame is a second frame that identifies the STA 202 via the stable device address.

Figure 3A:
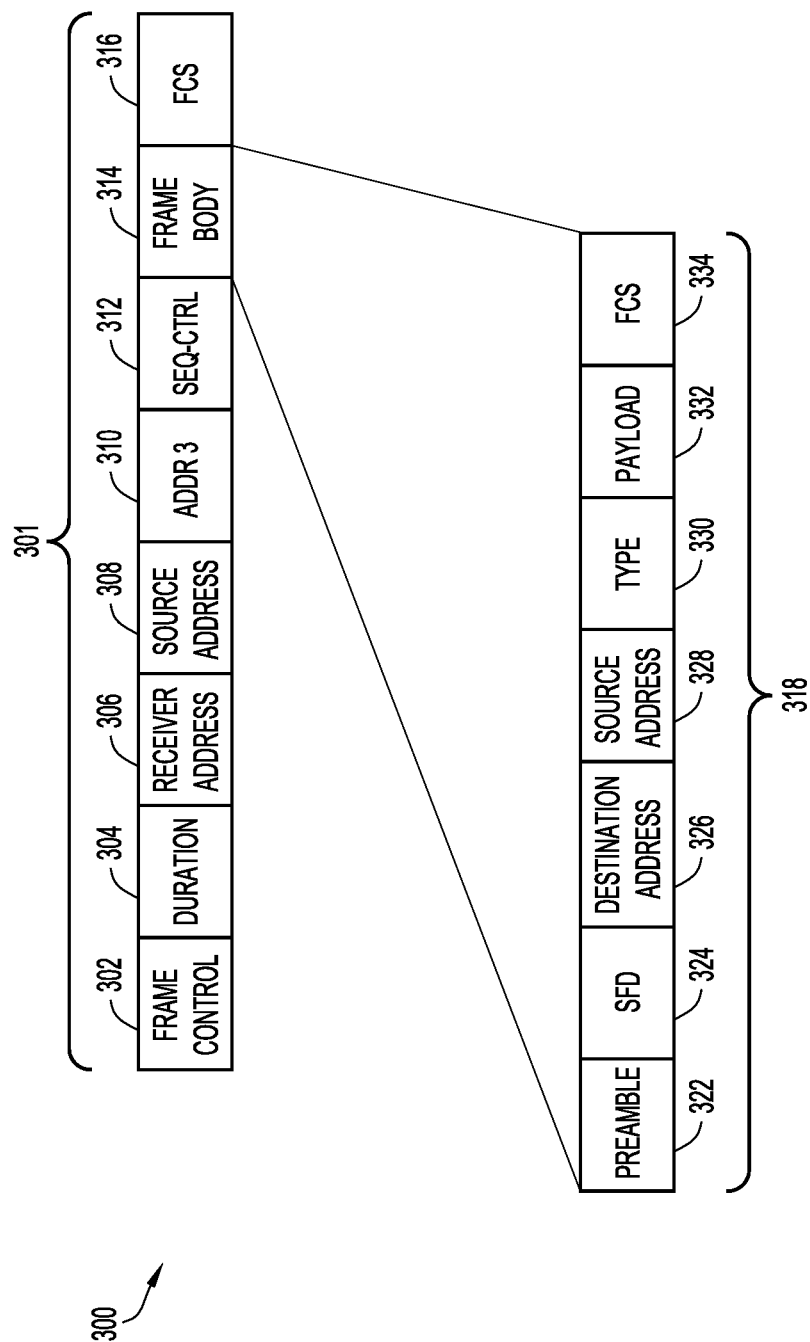
FIG. 3A illustrates a tunnel frame format used in accordance with the presented techniques, according to an example embodiment.

FIG. 3A shows a tunnel frame format 300 according to an example embodiment. FIG. 3A shows an 802.11 frame 301 that includes a frame control field 302, duration field 304, receiver address field 306, source address field 308, address 3 field 310, a sequence control field 312, a frame body field 314, and a frame check sequence (FCS) field 316. In some embodiments, the frame 301 is transmitted by a STA or an AP. When transmitted by a STA, in at least some embodiments, the source address field 308 identifies the STA via a rotating device address (e.g., a rotating MAC address). When transmitted by an AP to a STA, the receiver address field 306 identifies the STA via the OTA device address of the STA.

FIG. 3A illustrates that the frame body field 314 of the frame 301 encapsulates or provides a tunnel for a second frame 318. In one embodiment, the second frame 318 is an IEEE 802.3 frame. The second frame 318 includes a preamble 322, start frame delimiter (SFD) field 324, destination address field 326, source address field 328, type field 330, payload field 332, and a frame check sequence (FCS) field 334. As discussed above with respect to FIG. 2, some embodiments involve tunneling a packet identifying a STA via a stable station (e.g., MAC) address inside a packet (e.g. frame 301) identifying the STA via a rotating OTA device address. Thus, the second frame 318 identifies the STA via a stable device address in the source address field 328 when transmitted by the STA, and via the stable device address in the destination address field 326 when transmitted to the STA. Data transmitted between the STA and the network is carried in the payload field 332.

Figure 3B:
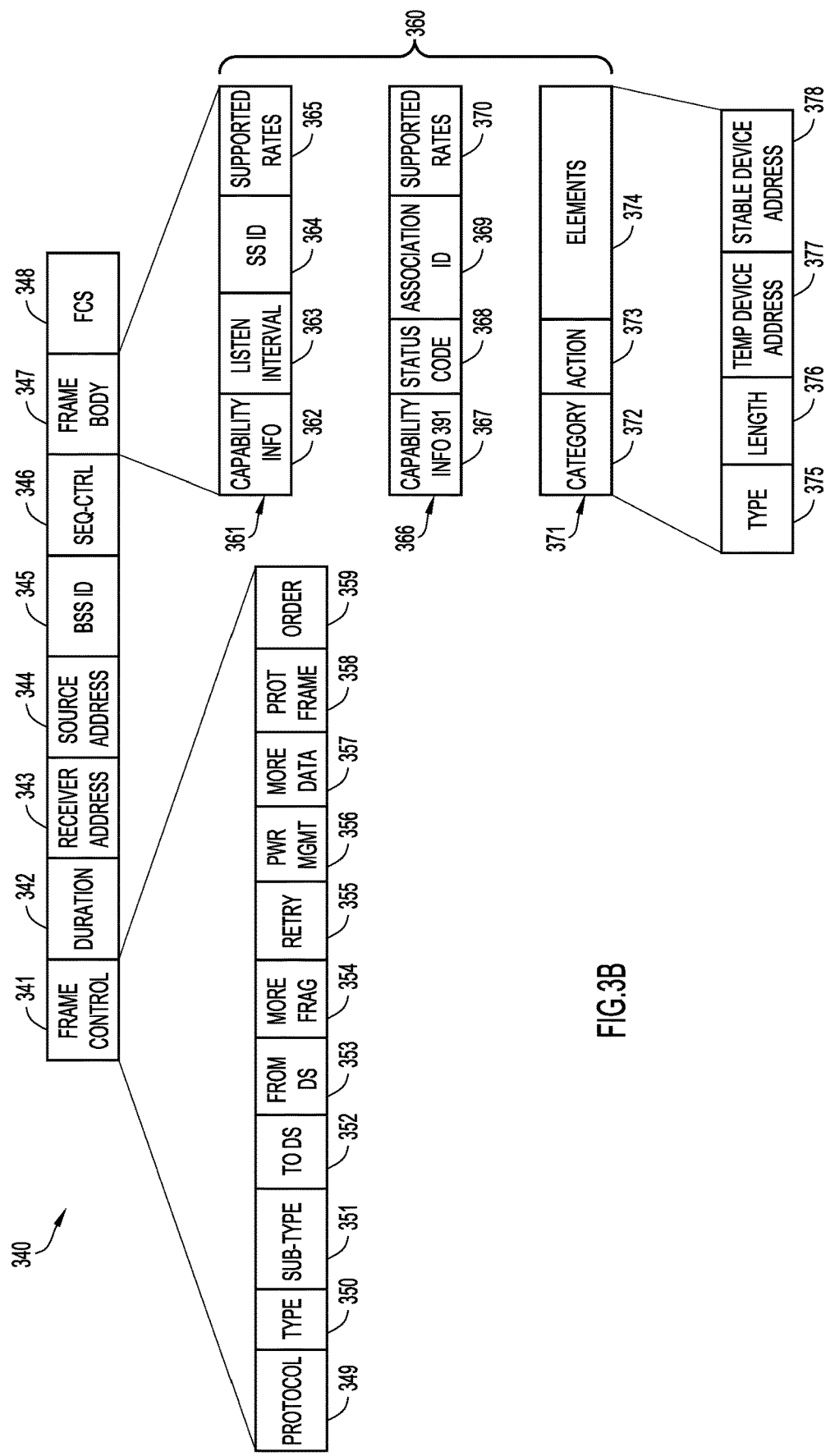
FIG. 3B illustrates frame formats used in accordance with the presented techniques, according to an example embodiment.

FIG. 3B illustrates frame formats according to an example embodiment. FIG. 3B illustrates a frame 340 that includes a frame control field 341, duration field 342, receiver address field 343, source address field 344, basic service set (BSS) identifier (BSSID) field 345, sequence control field 346, frame body field 347, and a FCS field 348. FIG. 3B further shows an example format of the frame control field 341. The frame control field 341 includes a protocol field 349, type field 350, sub-type field 351, toDS field 352, fromDS field 353, more fragments field 354, retry field 355, power management field 356, more data field 357, protected frame field 358, and an order field 359. The frame control field 341 defines, at least in some embodiments, a type of the frame 340. For example, management frame have a value in the type field 350 of 0b00. Management frames include association request (sub-type field 351 value of 0b0000), association response (sub-type field 351 value of 0b0001), and action frames (sub-type field 351 value of 0b 1101). Data frames have a type field 350 value of 0b10. As discussed below, various embodiments transmit and or receive one or more of association request frame, association response frame, and action frames. Some embodiments of these frames are in accordance with the example frame formats described above and below with respect to FIG. 3B.

FIG. 3B shows three variations 360 of a format of the frame body field 347 in an association request frame. A first variation is labeled as frame body field 361. Frame body field 361 includes a capability info field 362, listen interval field 363, service set identifier (SSID) field 364, and a supported rates field 365. An association request frame is not limited to the example format of the frame body field 361.

An association response frame has, in some embodiments, a frame body in accordance with the frame body 366 shown in FIG. 3B. The frame body 366 includes a capability information field 367, a status code field 368, an association identifier field 369, and a supported rates field 370.

An action frame has, in some embodiments, a frame body in accordance with the frame body field 371 shown in FIG. 3B. The frame body field 371 includes a category field 372, action field 373, and an elements field 374. In some embodiments, the category field 372 and/or action field 373, alone or in combination, define a type of an action frame. For example, a security association (SA) frame is an action frame, in at least some embodiments, having category field 372 value set to a value of eight (8) decimal. In some embodiments, a tunnel request action frame has a category field 372 value set to a value between 10 and 125 decimal. In some embodiments, an action frame communicating a mapping between an OTA device address and a stable device address has a category field 372 value set to a value within the range of 10-125 decimal (different than the tunnel request action frame category field value, at least in some embodiments. Some embodiments combine these two functions into a single action frame. In some embodiments of an action frame that communicates an OTA address mapping to a stable device address, the mapping is defined in an information element (IE) included in the elements field 374. For example, FIG. 3B shows an example information element that defines the mapping. As shown in FIG. 3B, the information element includes a type field 375, length field 376, temporary (temp) device address field 377 (e.g., to store the OTA device address or device address subject to rotation), and a stable device address field 378. Such a mapping is communicated, in some embodiments, in a SA-response action frame, or in an action frame that has a category field reserved or otherwise assigned for this purpose.

Figure 3C:
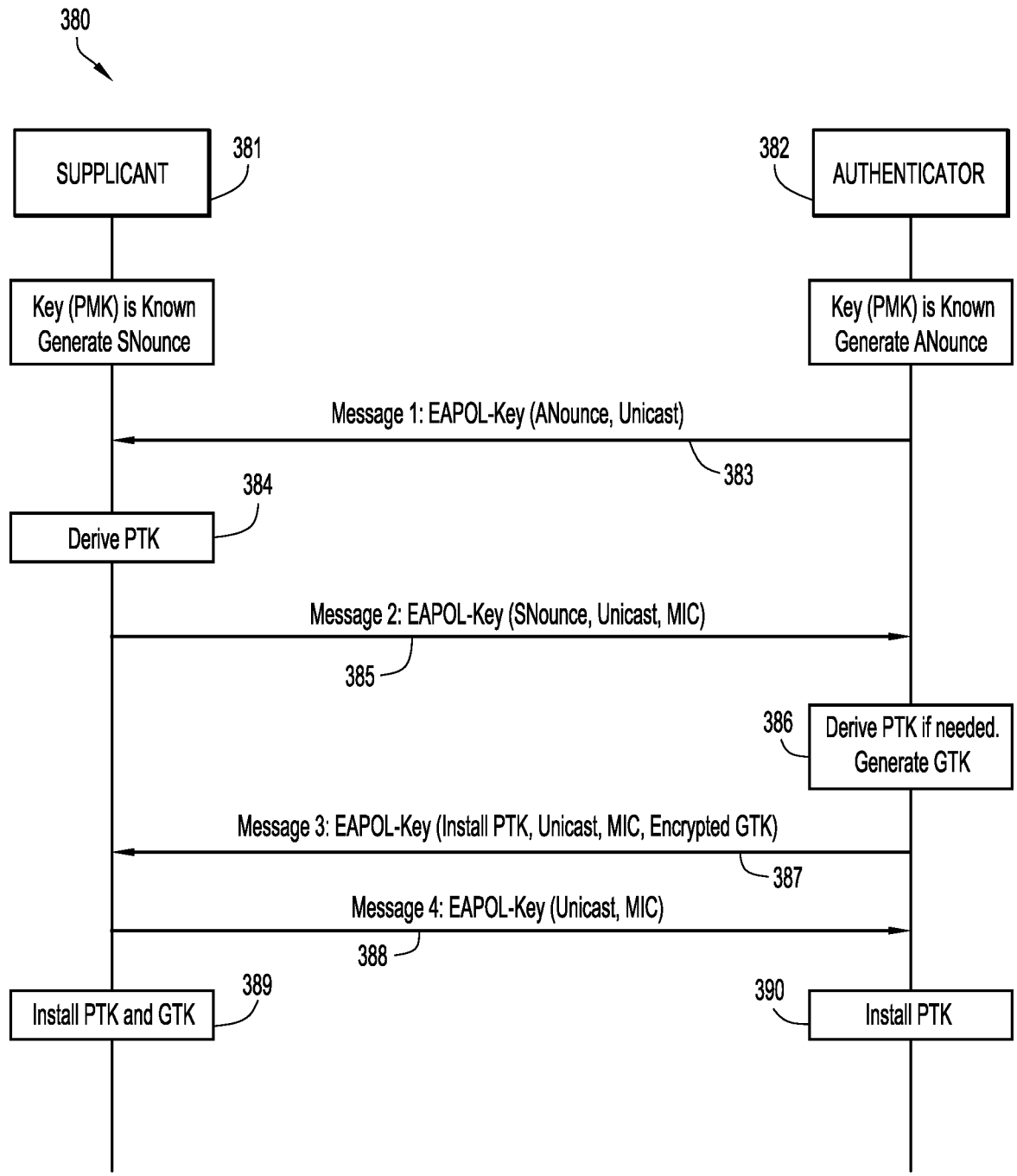
FIG. 3C illustrates a 4-way handshake between a supplicant and an authenticator that used in accordance with the presented techniques, in accordance with an example embodiment.

FIG. 3C illustrates a 4-way handshake 380 between a supplicant 381 (e.g., a STA) and an authenticator 382 (e.g. an AP) in accordance with an example embodiment. FIG. 3C shows that the supplicant 381 and the authenticator 382 are in possession of a pairwise master key (PMK) before the 4-way handshake process begins. The PMK is obtained by the supplicant 381 and authenticator 382 via an authentication process that occurs prior to the 4-way handshake.

FIG. 3C shows the authenticator 382 transmitting an Extensible Authentication Protocol over Local Area Network (EAPOL)-key message 383 to the supplicant. The EAPOL-key message 383 includes an ANonce. In response to receiving the EAPOL-key message 383, the supplicant is able to derive a Pairwise Transit Key (PTK) in step 384. The supplicant 381 responds to the EAPOL-key message 383 with an EAPOL-key message 385, which includes a SNonce, and a message integrity code (MIC). Upon receiving the EAPOL-key message 385, the authenticator 382 is able to derive a PTK in step 386. If needed, the authenticator 382 also generates a Group Temporal Key (GTK).

After deriving the PTK, the authenticator 382 generates an EAPOL-key message 387, indicating the supplicant 381 is to install the PTK. The EAPOL-key message 387 also includes a MIC, and the encrypted GTK (if applicable).

In response to receiving the EAPOL-key message 387, the supplicant 381 transmits an EAPOL-key message 388, which confirms that the EAPOL-key message 387 was received, and that the supplicant is installing the PTK. Each of the supplicant 381 and authenticator 382 then install the PTK in steps 389 and 390 respectively. The supplicant 381 also installs the GTK in step 389.

Figure 3D:
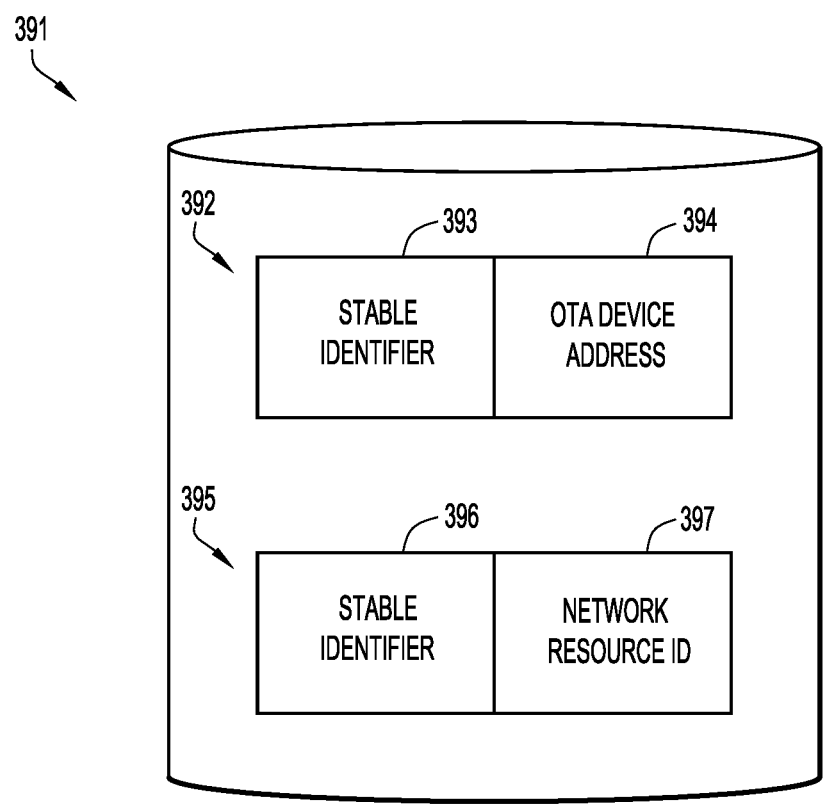
FIG. 3D illustrates data structures that store a mapping between a stable identifier and an over-the-air (OTA) device address in accordance with an example embodiment.

FIG. 3D illustrates data structures that store a mapping between a stable identifier and an OTA device address in accordance with an example embodiment. While the data structures of FIG. 3D are discussed below as relational database tables, the disclosed embodiments are not limited to these examples. For example, other embodiments utilize linked lists, arrays, unstructured data stores, or other data storage methods.

FIG. 3D illustrates a data store 391 including an address mapping table 392 and a network resource mapping table 395. The address mapping table 392 includes a stable identifier field 393 and an OTA device address field 394. The stable identifier field 393 stores a stable identifier for a single STA. In some embodiments, the stable identifier is a stable device address, such as a STA address assigned to a wireless STA by its manufacturer. The stable identifier stored for a particular wireless STA does not change. The OTA device address field 394 stores an OTA device address used by the STA for communication with an AP. Some embodiments store multiple address mappings in multiple rows of the address mapping table 392. In some embodiments, a single stable identifier is mapped to multiple different OTA device addresses via multiple rows of the address mapping table 392 (e.g. a value in the stable identifier field 393 is not necessarily unique within the address mapping table 392.

The network resource mapping table 395 includes a stable identifier field 396 and a network resource identifier field 397. The stable identifier field 396 stores an identifier that identifies a single wireless station. The stable identifier field 396 may be cross-referenced with the stable identifier field 393. Thus, some embodiments are able to identify one or more network resources associated with an OTA device address by first mapping the OTA device address to a stable identifier via the address mapping table 392, then mapping from the stable identifier to the network resource(s) via the network resource mapping table 395. A wireless device that is associated with multiple network resources may have multiple rows allocated in the network resource mapping table 395.

Figure 4:
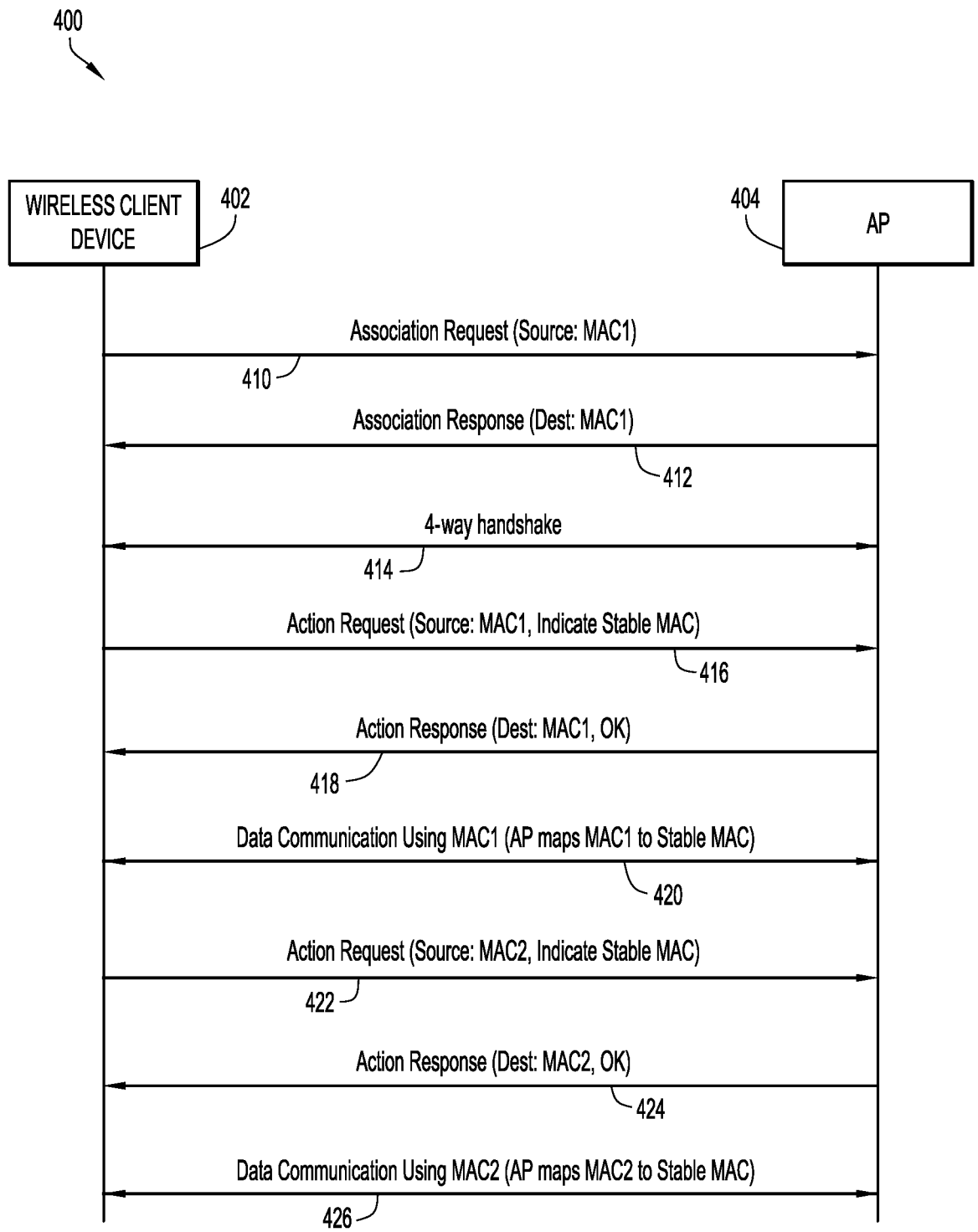
FIG. 4 is a diagram of a message sequence illustrating device address rotation in accordance with an example embodiment.

FIG. 4 is a diagram of a message sequence 400 illustrating device address rotation in accordance with an example embodiment. FIG. 4 illustrates a STA (wireless client device) 402 and an AP 404. The STA 402 associates with the AP 404 via an association request message 410. The STA 402 is identified in the association request message 410 via a first OTA device address in a source address field of an 802.11 header, at least in some embodiments. The AP responds by transmitting an association response message 412. The association response message 412 indicates a successful association, and identifies the STA 402 via the first OTA device address in a destination address field of the association response message 412.

The STA 402 and AP 404 then perform a 4-way handshake 414. Once the 4-way handshake completes, the STA 402 and AP 404 are both in possession of a shared key, such as a pairwise master key, which is used to encrypt communications between the STA 402 and AP 404. Thus, the STA 402 is able to securely communicate, based on the shared key, an action request frame 416 to the AP 404. The action request frame 416 identifies the STA 402 via the first OTA device address, but also includes a stable device address (e.g., stable MAC) that also identifies the first device address. Thus, the action request frame 416 communicates a mapping between the first OTA device address and the stable device address. The AP 404 responds to the action request frame 416 with an action response frame 418. The action response frame acknowledges receipt of the mapping, and identifies the STA 402 via the first OTA device address. The STA 402 and AP 404 then perform data communications 420, again based on the shared key, via the first OTA device address. The AP 404 uses the mapping obtained from the action request frame 416 to identify the STA 402. For example, the AP 404 maintains a data structure that maps network services and/or resources used/needed by the STA 402 to the stable device address provided in the mapping. Upon receiving a frame from the STA via the first OTA device address, the AP 404 is able to identify those resources and/or services by translating from the received first OTA device address to the stable device address.

At a later time, the STA rotates its OTA device address from the first OTA device address to a second OTA device address. The STA 402 transmits a second action request frame 422. The second action request frame 422 identifies the STA 402 via the second OTA device address, which the AP 404 is able to map back to the stable device address since the second action request frame 422 also indicates the stable device address. Thus, upon receiving the second action request frame 422 from the STA 402, the AP 404 can map from the second OTA device address, to the stable device address, and to the network services and/or resources that are associated with the stable device address. The AP 404 generates an action response frame 424 that acknowledges processing of the second action request frame 422. The STA 402 and AP 404 are then able to perform encrypted data communications 426 via the second OTA device address, and the AP is able to associate these communications with services and/or network resources previously associated with the first OTA device address.

Figure 5:
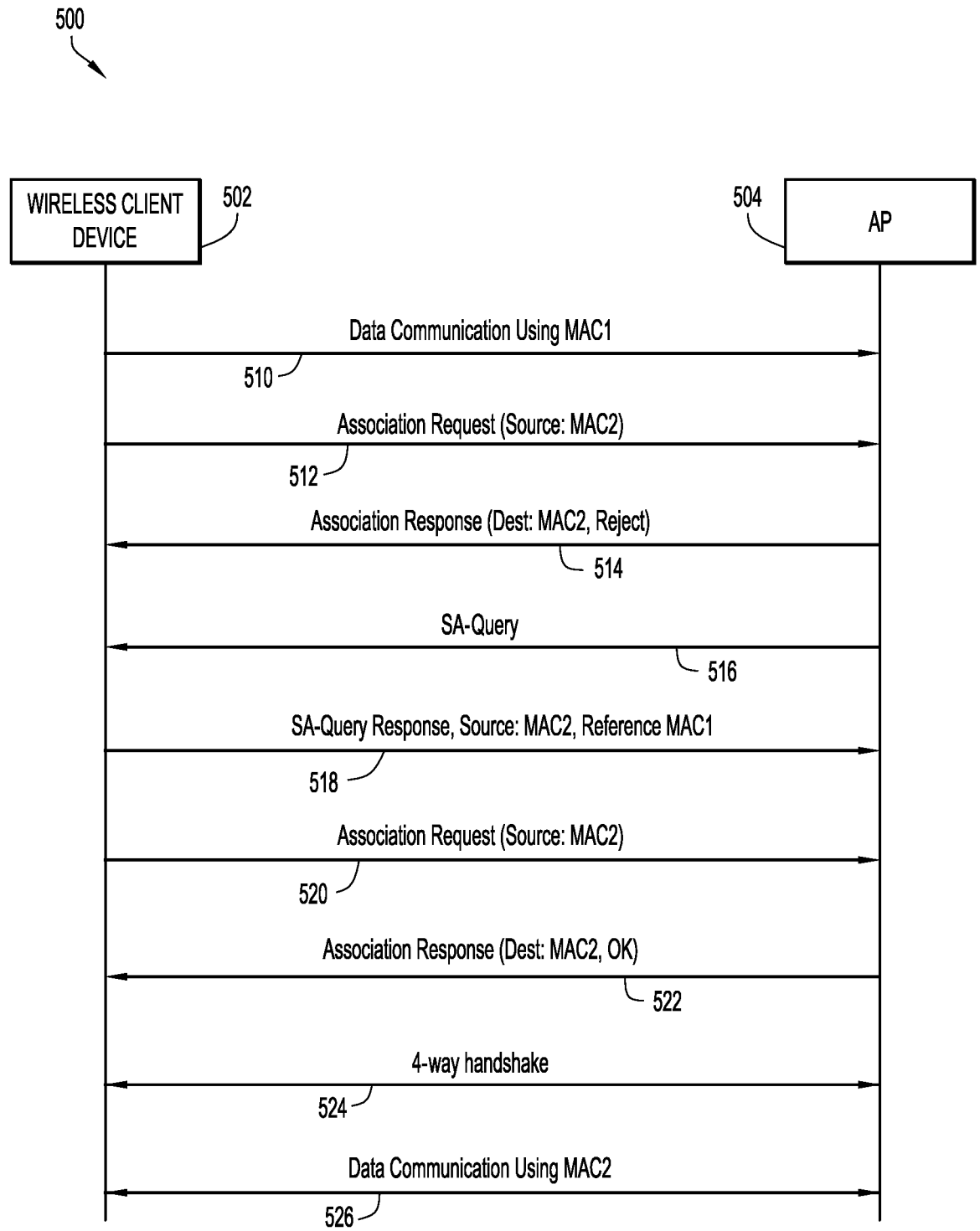
FIG. 5 is a diagram illustrating a message sequence that accomplishes device address rotation in accordance with an example embodiment.

FIG. 5 is a diagram illustrating a message sequence 500 that accomplishes device address rotation in accordance with an example embodiment. FIG. 5 shows an STA (wireless client device) 502 and an AP 504. The STA 502 and AP 504 are performing data communications 510 over a secure channel using a first device address. The secure channel was previously established, but the establishment of the secure channel is not shown in FIG. 5, for simplicity.

The STA 502 then initiates an association with the AP 504 via an association request message 512. The STA 502 is identified in the association request message 512 via a first OTA device address (e.g., "MAC1"). The association request message 512 includes the first OTA device address, in at least some embodiment, in a source address field of an 802.11 header of the association request message. The AP 504 responds to the association request message 512 via an association response message 514. The association response message 514 identifies the STA 502 as a destination of the association response message 514 via a destination address field in an 802.11 header of the association response message. The association response message 514 identifies the STA 502 via the first OTA device address. The association response message 514 indicates that the AP 504 is rejecting the association requested by the STA 502. The association response message 514 also indicates, in at least some embodiments, a wait time period before the STA 502 can attempt to associate with the AP 504. The AP 504 then initiates a SA-Query request 516 to the STA 502. The STA 502 responds to the SA-Query request 516 with a SA-Query response message 518. The SA-Query response message 518 indicates a mapping between the second OTA device address and a stable identifier or a reference device address.

In some embodiments, the mapping is indicated in an information element of the SA-Query response message 518.

After providing the mapping to the AP 504, the STA 502 initiates a second association request message 520. The STA 502 is identified in the second association request message 520 via the second OTA device address (e.g., "MAC2"). The AP 504, as a result of the SA-Query response message 518, is able to map from the second OTA device address to the reference identifier or reference device address, and identify that the device transmitting the second association request message 520 is the STA 502. As a result of the ability of AP 504 to identify the STA 502, the AP 504 responds to the second association request message 520 with an association response message 522, which indicates a successful association.

The STA 502 and AP 504 then perform a 4-way handshake 524. After the 4-way handshake 524 is successful, the STA 502 and AP 504 perform data communications 526 based on the second OTA device address.

Figure 6:
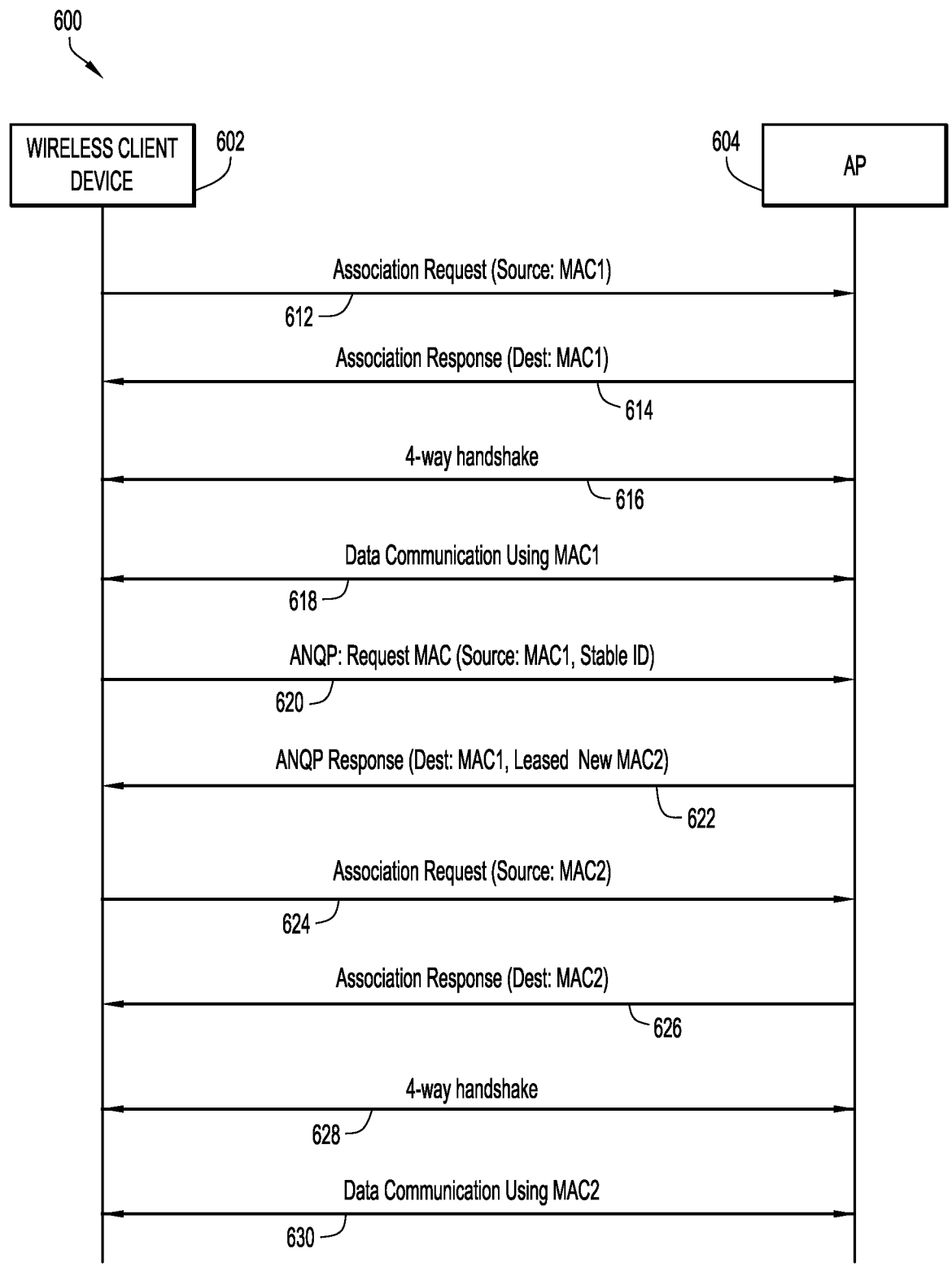
FIG. 6 is a sequence diagram illustrating rotation of a device address in an example embodiment.

FIG. 6 illustrates a message sequence for rotation of a device address in another example embodiment. The message sequence 600 is between a STA (wireless client device) 602 and an AP 604. The STA 602 initiates association with the AP 604 via an association request message 612. The association request message 612 identifies the STA 602 via a first OTA device address in a source address field of the association request message 612. The AP 604 responds to the association request message 612 with an association response message 614, which identifies that the association response message 614 is for the STA 602 via a destination address field in the association response message 614 that includes the first OTA device address.

The STA 602 and AP 604 then perform a 4-way handshake 616, where each of the STA 602 and AP 604 obtain a shared key that can be used to perform encrypted communication 618 between the two devices. The encrypted communication 618 relies on the first OTA device address to identify the STA 602.

The STA 602 then transmits an Access Network Query Protocol (ANQP) request message 620 to the AP 604. The ANQP request indicates the first OTA device address in a source address field of an 802.11 header included in the ANQP request message 620. The ANQP request message also indicates a stable identifier of the STA 602. In some embodiments, the stable identifier is a stable device address, such as a station address assigned to the STA 602 by a manufacturer. Based on the ANQP request message 620, the AP 604 is able to establish a mapping between the first OTA device address and the stable identifier. The AP 604 responds with an ANQP response message 622. The ANQP response message addresses the STA 602 via the first device address, but also provides the STA 602 with a second OTA device address. The STA 602 then transmits an association request message 624 to the AP 604, and identifies itself in the message via the new second device address provided to the STA 602 by the AP 604 in the ANQP response message 622. The AP 604 responds to the association request message 624 with an association response message 626, and indicates the new second device address as a destination address field in the association response message 626.

The STA 602 and AP 604 then perform a 4-way handshake 628, with the STA 602 identified during the 4-way handshake 628 via the second OTA device address. Once the 4-way handshake 628 is complete, the STA 602 and AP 604 are able to perform data communication 630 over an encrypted channel via shared key information made available during the 4-way handshake 628.

Figure 7A:
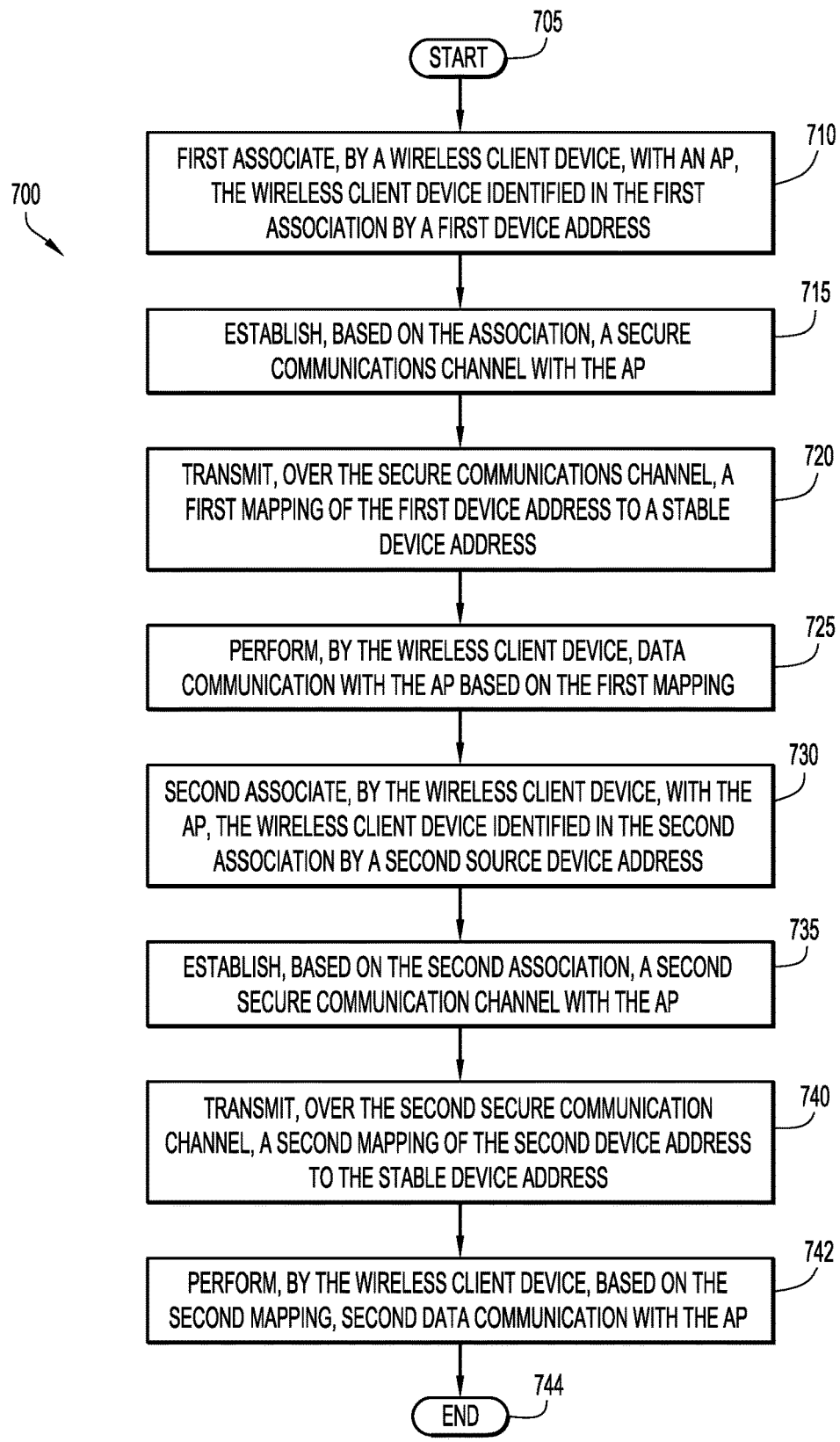
FIG. 7A is a flowchart of a method of rotating a device address in accordance with an example embodiment.

FIG. 7A is a flowchart of a method 700 of rotating a device address in accordance with an example embodiment. The method 700 depicted in FIG. 7A is performed by a wireless client device (e.g., a STA).

After start operation 705, the method 700 moves to operation 710, where a first association is performed by a wireless client device (e.g., an STA). The association is with an AP. The association includes, in some embodiments, the wireless client device transmitting an association request message to the AP, and the AP responding with an association response message. The association request message identifies the wireless client device via a first OTA device address in a source address field of the association request message. The association response message identifies the wireless client device via the first OTA device address in a destination address field of the association response message.

The association, in some embodiments, establishes an association identifier (e.g. via association identifier field 369) that the wireless client device can utilize to identify its relationship with the AP. Some embodiments of operation 710 include receiving an association response message from the AP. The association response includes, in some embodiments, a status code field (e.g. status code field 368) indicating whether the association was successful. Some embodiments of operation 710 evaluate the status code field and condition further performance of method 700 on whether the association was successful.

After the association is complete, method 700 moves to operation 715, where a secure communications channel is established based on the association. In some embodiments, the secure communications channel is established via a 4-way handshake between the wireless client device and the AP. As described above, the 4-way handshake is a process of exchanging four messages between the AP (acting as an authenticator) and a client device (e.g., the wireless client device, acting as the supplicant). The 4-way handshake provides for generation of encryption keys that are used to establish the secure communications channel, as described above in connection with FIG. 3C.

In operation 720, a first mapping between the first device address and a stable device address is transmitted over the secure channel to the AP from the wireless client device. In some embodiments, the stable device address is a MAC address provided to the wireless client device by its manufacturer. In some embodiments, the first device address is a locally administrated station address. In some embodiments, the first mapping is transmitted to the AP via an action frame. In some embodiments, operation 720 includes generating the action frame so as to request a tunnel be established using the first OTA device address to identify the wireless client device, with the tunnel encapsulating a set of frames that identifies the wireless client device using the stable device address instead of the first OTA device address.

In operation 725, data communication with the AP is performed based on the mapping. For example, in some embodiments, the wireless client device utilizes the first device address as an OTA device address when communicating data with the AP. Thus, packets destined for the wireless client device from the AP include the first OTA device address as a destination address in the OTA packet. Packets destined for the AP from the wireless client device indicate the first OTA device address as a source address in these packets. In embodiments that rely on a tunneling solution for communication between the wireless client device and AP, operation 725 includes generating a first frame that identifies the wireless client device via the stable device address. The first frame, in some embodiments, is generated according to IEEE 802.3 standard frame format. The first frame is then encapsulated within a second frame, which identifies the wireless client device via the first OTA device address. In some embodiments, the second frame is generated in accordance with an IEEE 802.11 standard frame format. The second frame is then transmitted to the AP. In some embodiments of operation 725, a third frame is received from the AP, and decoded to de-encapsulate a fourth frame from the third frame. The third frame identifies the wireless client device via the first OTA device address, and complies, in some embodiments, with an 802.11 frame format, which is relied upon when it is decoded by operation 725. The fourth frame is decoded according to an 802.3 packet format, and identifies the station via the stable device address.

In operation 730, a second association between the wireless client device and the AP is performed. Operation 730 is similar, in some embodiments, to operation 710, except that the wireless client device utilizes a second OTA device address to identify itself to the AP instead of the first device address discussed above. Thus, at operation 730, the wireless client device has rotated its OTA device address from the first OTA device address to the second OTA device address.

In operation 735, a second secure channel is established based on the second association. In some embodiments, operation 735 is performed in a similar manner to that of operation 715, except that the station relies on the second OTA device address to identify itself instead of the first OTA device address relied upon in operation 715.

In operation 740, a second mapping is communicated over the second secure channel to the AP by the station. Operation 740 operates in a similar manner to operation 720, discussed above, except that the second mapping maps the second OTA device address to the stable device address, whereas the first mapping communication in operation 720 mapped the first OTA device address to the stable device address. In some embodiments, the second mapping is communicated to the AP via an action frame. In some embodiments, operation 720 includes generating an action frame that requests a tunnel be established using the second OTA device address, with the tunnel encapsulating a set of frames that identifies the station using the stable device address instead of either the first OTA device address or the second OTA device address.

In operation 742, second data communication are performed based on the second mapping. Thus, the second data communications identify the wireless client device using the second OTA device address. As discussed above, some embodiments of operation 742 include encapsulating a first frame (of operation 742) that identifies the wireless client device via the stable device address, within a second frame (of operation 742) that identifies the wireless client device via the second OTA device address. The second frame is then transmitted to the AP. Some embodiments of operation 742 include receiving a third frame (of operation 742) from the AP that identifies the wireless client device via the second OTA device address. Operation 742 then decodes the third frame to de-encapsulate or otherwise identify a fourth frame (of operation 742) that identifies the wireless client device based on the stable device address. In some embodiments, the third frame is decoded in conformance with an IEEE 802.11 frame format. A data payload of the fourth frame is then processed by the wireless client device as inbound network packet data. In some embodiments, the fourth frame is decoded in conformance with an IEEE 802.3 frame format.

After operation 740 completes, method 700 moves to end operation 744.

Figure 7B:
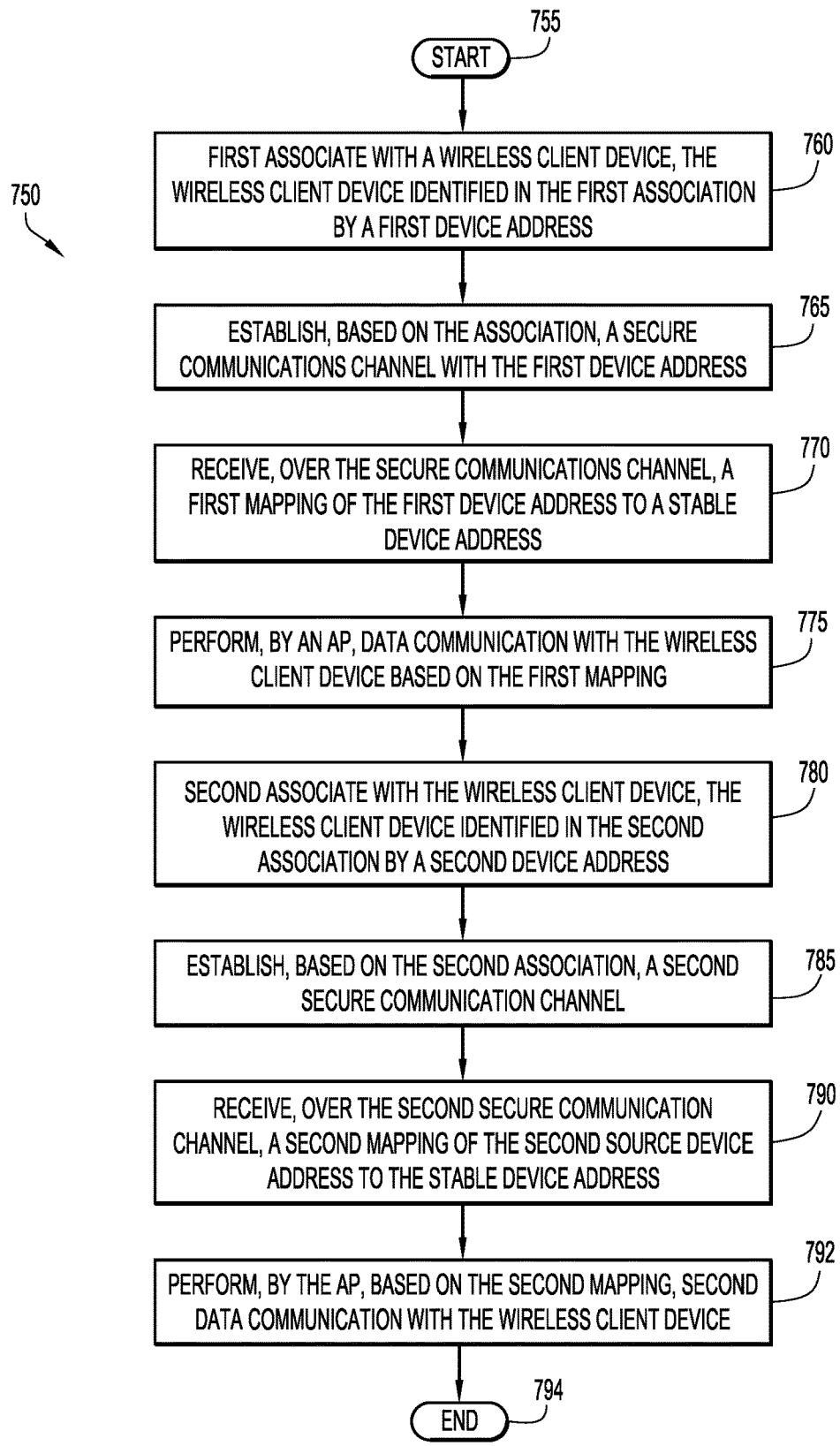
FIG. 7B is a flowchart of a method of identifying a station that rotates an OTA device address in accordance with an example embodiment.

FIG. 7B is a flowchart of a method of identifying a wireless client device that rotates an OTA device address in accordance with an example embodiment. Whereas method 700 discussed above in connection with FIG. 7A is performed by a wireless client device, method 750 is performed, in at least some embodiments, by an AP or by some other device in the wireless network infrastructure, such as a WLC. Thus, in some embodiments, a first device performing the method 700 works in concert with a second device performing the method 750 to accomplish communication between the two devices while the first device rotates a device address.

After start operation 755, method 750 moves to operation 760, where a first association is performed by a wireless client device. In some embodiments, operation 760 includes receiving an association request message from the wireless client device (e.g. including the frame body field 314 shown in FIG. 3B, in some embodiments). Some embodiments of operation 760 include decoding a source address field of the association request message (e.g. source address field 344 shown in FIG. 3B) to identify a first OTA device address that identifies the wireless client device sending the association request message. In some embodiments, operation 760 searches a data store to identify a record associated with a source address specified in the association request message. Some embodiments of a device performing the method 750 maintain a mapping between OTA device addresses of devices, and another network infrastructure resource. When receiving an association request from an OTA device address that has not previously been "seen" by the executing device (AP or WLC), the OTA device address will not be identified in the mapping. Some embodiments of operation 760 include transmitting an association response back to the wireless client device that sent the association request. In some embodiments, the association response message includes one or more fields of the example frame body 366 described above with respect to FIG. 3B. For example, some embodiments of operation 760 include assigning an association identifier to the wireless client device initiating the association, and including the association identifier in the association response (e.g. in association identifier field 369 shown in FIG. 3B). Some embodiments store an association between the OTA source address of the association request and the association identifier.

In operation 765, a secure communications channel is established with the wireless client device (that sent the association request). Similar to operation 715 discussed above with respect to method 700, some embodiments of operation 765 perform one side of a 4-way handshake with the wireless client device to establish the secure communications channel. The device performing the method 750 acts as an authenticator in the 4-way handshake, described above in connection with FIG. 3C, to establish the secure communications channel.

In operation 770, a mapping of the first device address to a stable identifier, (e.g. a stable device address) is received over the secure channel. In some embodiments, operation 770 includes decoding an action frame to identify the mapping. In some embodiments, the mapping is included in an information element of the action frame (e.g. an information element in the elements field 374 shown in FIG. 3B). Some embodiments store the mapping in a data structure analogous to the address mapping table, discussed above with respect to FIG. 3D. Some embodiments of operation 770 include decoding an action frame to identify a tunneling request. As discussed above, some embodiments establish a secure tunnel between a wireless client device and an AP. Within the secure tunnel, frames are exchanged that identify the wireless client device via the stable device address.

In operation 775, data communication with the wireless client device is performed based on the first mapping. In some embodiments, operation 775 includes decoding a first frame received from the wireless client device over the secure communications channel to identify a second frame. In some embodiments, the first frame conforms to an 802.11 frame format and the second frame conforms to an 802.3 frame format.

Some embodiments of operation 775 further including encapsulating a third frame identifying the wireless client device via the stable device address in a fourth frame that identifies the wireless client device using the first OTA device address. In some embodiments, the mapping from the stable device address to the first OTA device address is accomplished by searching a data structure analogous to the address mapping table described above with respect to FIG. 3D, to find the stable device address (e.g. in stable identifier field). The correct OTA device address to utilize is then available in a field analogous to the stable identifier field. In some embodiments, the third frame complies with an IEEE 802.3 packet format, and the fourth frame is generated in accordance with an IEEE 802.11 frame format, as depicted in FIG. 3A. The fourth frame is then transmitted over a wireless medium to the wireless client device.

In operation 780, a second association is performed with the wireless client device. The second association differs from the first association discussed above with respect to operation 760 in that the wireless client device is identified via a second OTA device address. Thus, the wireless client device has rotated its OTA device address between operation 775 and operation 780.

In operation 785, a second secure communications channel is established based on the second association performed in operation 780. Operation 785 is performed in a similar manner as operation 765, discussed above. For example, some embodiments of operation 785 include performing a 4-way handshake with the wireless client device to install a PTK.

In operation 790, a second mapping is received over the second secure communication channel. The second mapping maps the second OTA device address to the stable identifier or stable device address. Some embodiments store the second mapping in a data structure analogous to the address mapping table described above with respect to FIG. 3D. Thus, with the second mapping, a device performing the method 750 is able to identify that the device, sending packets that identify the sending device via the second OTA device address, as the same device that identifies itself via the first OTA device address (e.g. by consulting a data structure analogous to the address mapping table described above with respect to FIG. 3D). Based on this identification, some embodiments of method 750 associate one or more network resources previously allocated to the first OTA device address to the second OTA device address. For example, an Internet Protocol (IP) address previously used with the first OTA device address is allocated to the second OTA device address. In some embodiments, a mapping from the first OTA device address to an infrastructure station address is changed to instead map the second OTA device address to the infrastructure station address. In some embodiments, an infrastructure station address is a device address that identifies a wireless client device to a network as the wireless client device rotates its OTA device address. The infrastructure remains the same during these rotations such that, for example, another device with which the wireless client device is engaged in IP level communications is able to maintain communications with the wireless client device despite the rotation, as the rotation of device addresses is not visible to the other device.

In operation 792, second data communication is performed with the wireless client device based on the second mapping. Similar to the communications of operation 775, some embodiments of the method 700 include receiving a first frame from the wireless client device, the first frame identifying the wireless client device via the second OTA device address in a destination address field of the first frame. In these embodiments, operation 792 further includes decoding it to identify a second frame encapsulated with the first frame. The second frame identifies the wireless client device via the stable device address. Based on the stable device address of the second frame, the device executing the method 700 is able to identify network resources associated with the wireless client device, such as an IP address, infrastructure station address, public keys, or other network resources.

Some embodiments of operation 792 further include generating a third frame identifying the wireless client device via the stable device address (or receiving the first frame from another infrastructure component, such as a WLC or a firewall), and encapsulating the third frame in a fourth frame, that identifies the wireless client device via the second OTA device address. In some embodiments, the third frame is generated to comply with an 802.3 frame format while the fourth frame is generated to comply with an 802.11 frame format. The fourth frame is then transmitted over a wireless medium to the wireless client device.

After operation 792 completes, method 750 moves to end operation 794.

Figure 8A:
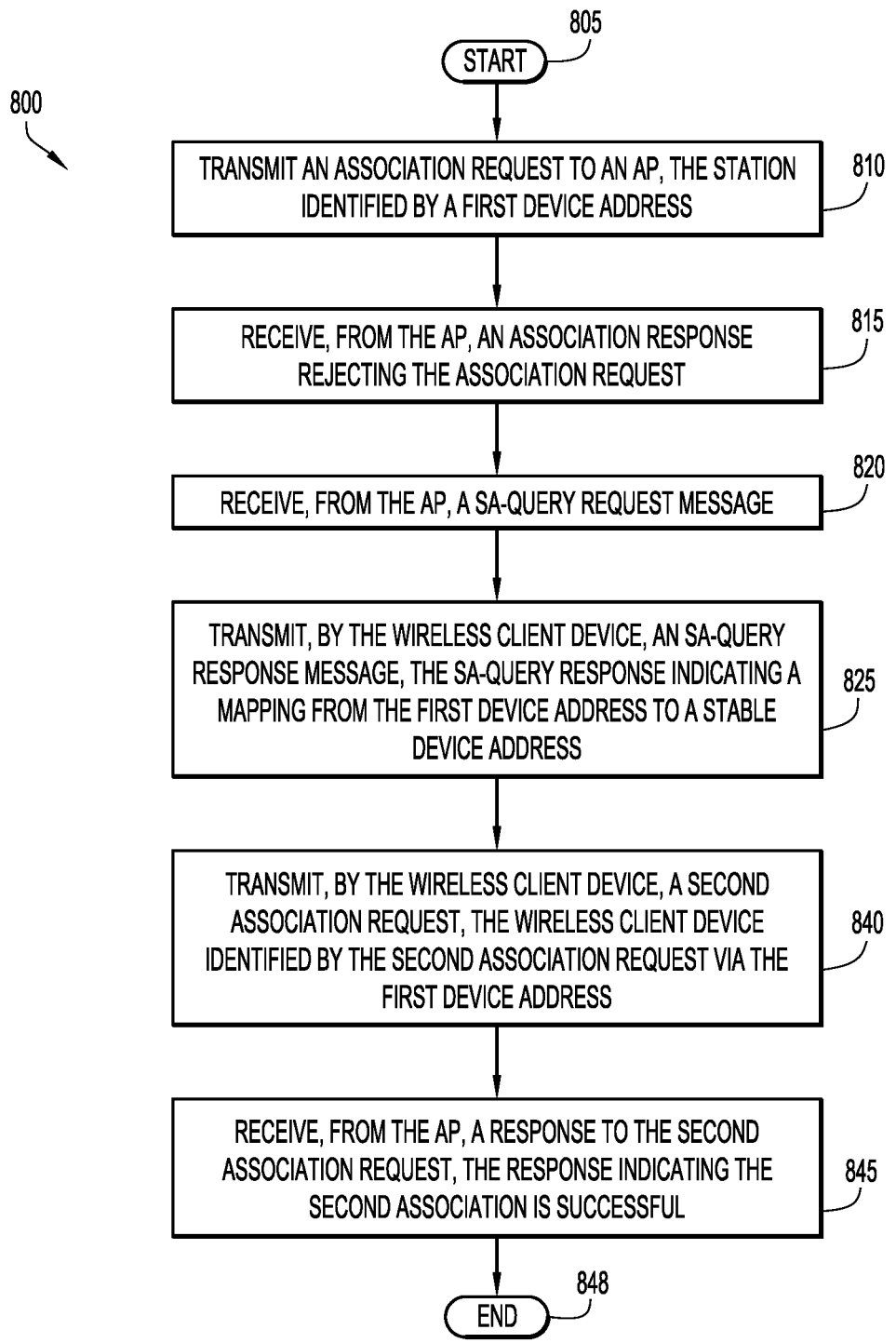
FIG. 8A is a flowchart of a method of rotating a device address in accordance with an example embodiment.

FIG. 8A is a flowchart of a method 800 of rotating a device address in accordance with an example embodiment. In some embodiments, method 800 is performed by a wireless client device, such as the wireless client device represented by STA 102A, STA 102B, and/or STA 102C in FIG. 1.

After start operation 805, method 800 moves to operation 810, where a first association request is transmitted to an access point. The association request identifies a wireless client device transmitting the first association request via a first OTA device address. In some embodiments, the association request includes the example of the frame body field 361 discussed above with respect to FIG. 3B.

In operation 815, an association response is received from the AP. The association response indicates the AP has rejected the association request transmitted in operation 810. In some embodiments, the rejection is indicated via a status code in the status code field 368 of frame body 366, discussed above with respect to FIG. 3B. In some embodiments, the association response message received in operation 815 is decoded to determine a minimum wait time before an additional association can be attempted.

In operation 820, an SA-Query request is received from the AP. As discussed above with respect to FIG. 3B, an SA-Query request is denoted, in at least some embodiments, by particular values in a category field (e.g. category field 372 of frame body field 371) of an action frame.

In response to the SA-Query request received in operation 820, operation 825 transmits a SA-Query response message. The SA-Query response message indicates a mapping from the first OTA device address to a stable identifier or stable device address. As discussed above with respect to FIG. 3B, in some embodiments, and SA-Query response message is an action frame having a particular category field value.

In operation 840, a second association request is transmitted to the AP. The second association request identifies the wireless client device via the first OTA device address. Similar to the association request of operation 810, the second association request includes, in some embodiments, a frame body formatted according to the example of the frame body field 371 discussed above with respect to FIG. 3B.

In operation 845, a second response to the second association request is received. The second response indicates that the second association request succeeded in forming an association with the AP (e.g. via the status code field 368). Some embodiments of method 800 then communicate with the AP based on the successful association. For example, some embodiments perform a 4-way handshake with the AP based on the successful association, which provides a secure communication channel with the AP. The wireless client device is then able to exchange data with the AP over the secure communications channel.

After operation 845 completes, method 800 moves to end operation 848.

Figure 8B:
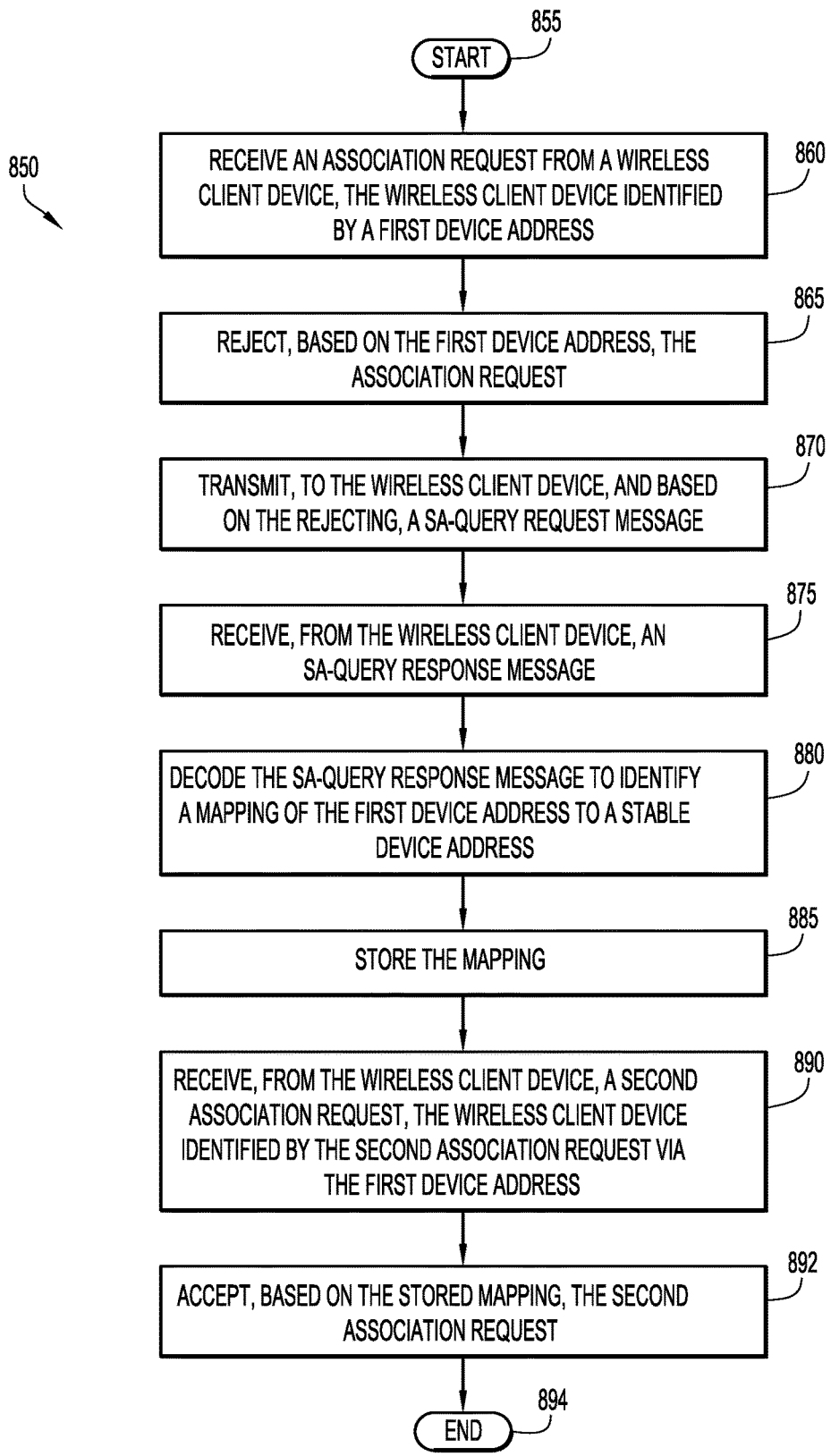
FIG. 8B is a flowchart of another method of rotating a device address in accordance with an example embodiment.

FIG. 8B is a flowchart of a method 850 of rotating a device address in accordance with an example embodiment. Method 850 is performed by an AP or WLC, for example, After start operation 855, method 850 moves to operation 860, where a first association request is received from a wireless client device. The wireless client device is identified via a first OTA device address in a source address field of the first association request (e.g. the source address field 308). In some embodiments, the association request message includes a frame body field (e.g. frame body field 314) formatted in a manner consistent with the example of the frame body field 371, discussed above with respect to FIG. 3B.

In operation 865, the association request is rejected. Rejecting the association request includes, in at least some embodiments, transmitting an association response message to the wireless client device, the association response indicating the rejection. In some embodiments, the rejection is based on the use of the first OTA device address in the association request of operation 860. For example, in some embodiments, operation 860 checks or searches a data store that records data associated with an OTA device address (such as a mapping between the OTA device address and a stable device address). When there is a failure to identify any such records, and thus no information or mapping is found, the association request is rejected, at least in some embodiments. The rejection is indicated, in some embodiments, in a status field of an association response sent to the wireless client device.

Operation 870 transmits to the wireless client device, and based on the rejection of the association request, an SA-Query request message. As discussed above with respect to FIG. 3B, in some embodiments, and SA-Query request message is an action frame that indicates a particular value in a category field (e.g., category field 372) of the action frame (e.g. via frame body field 371).

In operation 875, an SA-Query response message is received from the wireless client device. The SA-Query response message is also an action frame having a particular predefined category field value, at least in some embodiments. In operation 880, the SA-Query response message is parsed or otherwise decoded to obtain a mapping from the first OTA device address to a stable device address. For example, as discussed above with respect to the example frame body field 371 of an action frame, some embodiments decode an information element from the elements field 374, and obtain a mapping (e.g., represented by temp device address field 377 and stable device address field 378).

In operation 885, the mapping obtained from the action frame is stored for use in communication with the wireless client device. In particular the mapping is used to identify the wireless client device based on a message that utilizes the first OTA device address to identify the wireless client device. Via the mapping, a device performing the method 850 is able to identify a common wireless client device responsible for sending packets that identify the wireless client device using two or more different OTA device addresses. Some embodiments store the mapping in a data structure analogous to the address mapping table, discussed above with respect to FIG. 3D.

In operation 890, a second association request is received from the wireless client device. The wireless client device is identified by the second association request via a source address field that stores the first OTA device address. In some embodiments, operation 890 searches previously stored mappings for the first OTA device address based on it being indicated in the source address field. If a mapping for the device address is found, the device performing the method 800 is able to translate from the OTA device address used in the second association request to a stable identifier, such as a stable device address, that identifies a unique device attempting the association (e.g. the wireless client device).

In operation 892, the second association request is accepted. Accepting the second association request includes, in at least some embodiments, transmitting an association response message to the wireless client device, with the association response message indicating the association is accepted (e.g., via the status code field 368). Operation 892 indicates, in some embodiments, an association identifier for the successful association in the association response message (e.g., via the association identifier field 369 in some embodiments.

After operation 892, method 850 moves to end operation 894.

Figure 9:
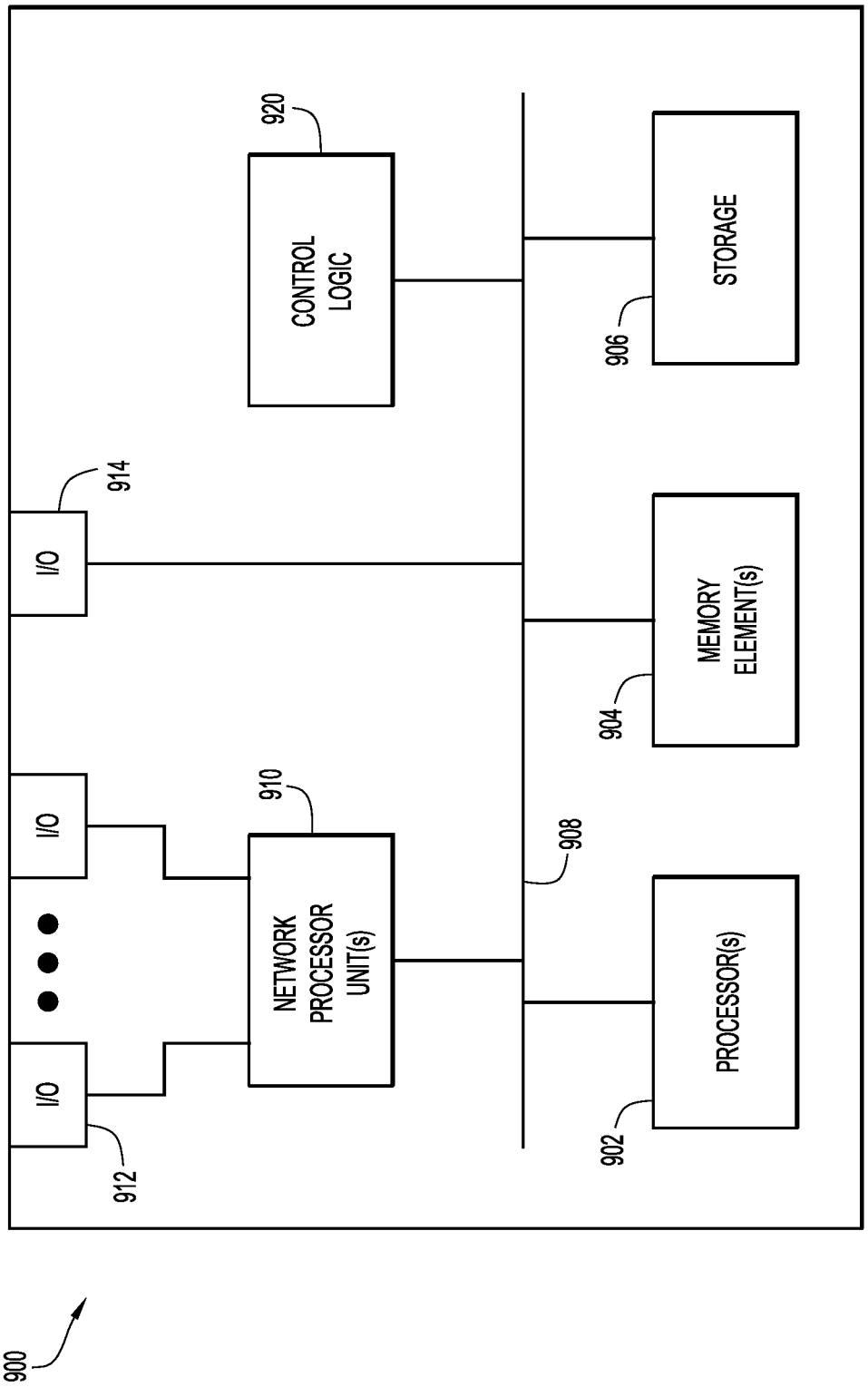
FIG. 9 is a hardware block diagram of a device that may perform functions associated with operations discussed herein in connection with the techniques depicted in any one or more of FIGS. 1-8B.

FIG. 9 is a hardware block diagram of a device 900 that may perform functions associated with operations discussed herein in connection with the techniques depicted in any one or more of FIGS. 1-8B. In various embodiments, any of the devices described above (e.g., an AP, STA (wireless client device) WLC, or other device.) implement a computing architecture analogous to that described below with respect to the device 900.

In at least one embodiment, the device 900 includes hardware processing circuitry such as one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, devices, or entities, via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 900 and other systems, devices, or entities to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input and/or output device now known or hereafter developed. This may be the case, in particular, when the device 900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. [moo] The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

[owl] In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fib®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, an method is provided comprising: associating with a wireless client device, the wireless client device identified via a first device address; establishing, based on the associating, a first secure communication channel with the wireless client device; receiving, over the first secure communication channel, a first mapping of the first device address to a stable device address; performing first data communication with the wireless client device based on the first mapping; second associating with the wireless client device, the wireless client device identified via a second device address; establishing a second secure communication channel with the wireless client device; receiving, over the second secure communication channel, a second mapping of the second device address to the stable device address; and performing second data communication with the wireless client device based on the second mapping.

In another form, an apparatus is provided comprising: a network interface configured to enable network communications; one or more processors; and one or more memories storing instructions that when executed configure the one or more processors to perform operations comprising: associating with a wireless client device, the wireless client device identified via a first device address; establishing, based on the associating, a first secure communication channel with the wireless client device; receiving, over the first secure communication channel, a first mapping of the first device address to a stable device address; performing first data communication with the wireless client device based on the first mapping; second associating with the wireless client device, the wireless client device identified via a second device address; establishing a second secure communication channel with the wireless client device; receiving, over the second secure communication channel, a second mapping of the second device address to the stable device address; and performing second data communication with the wireless client device based on the second mapping.

In still another form, a method is provided comprising: receiving, from a wireless client device, an association request to associate to a wireless network, the wireless client device identified by the association request via a first device address; rejecting, based on the first device address, the association request; transmitting, to the wireless client device, and based on the rejecting, a security association (SA)-query request message; receiving, from the wireless client device, a SA-query response message; decoding the SA-query response message to identify a mapping of the first device address to a stable device address; storing the mapping; receiving, from the wireless client device, a second association request, the wireless client device identified by the second association request via the first device address; and accepting, based on the stored mapping, the second association request.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
first associating with a wireless client device, the wireless client device identified via a first device address;
establishing, based on the first associating, a first secure communication channel with the wireless client device;
receiving, over the first secure communication channel, a first mapping of the first device address to a stable device address;
performing first data communication with the wireless client device based on the first mapping;
second associating with the wireless client device, the wireless client device identified via a second device address;
establishing a second secure communication channel with the wireless client device;
receiving, over the second secure communication channel, a second mapping of the second device address to the stable device address; and
performing second data communication with the wireless client device based on the second mapping,
wherein the first data communication and the second data communication are tunneled between an access point and the wireless client device, and
wherein a four-way handshake is performed between the wireless client device and the access point after each of the first associating and the second associating.

2. The method of claim 1, further comprising receiving from the wireless client device an action request frame that indicates the first mapping, wherein the action request frame is decoded to identify a request for tunneling of a first frame identifying the wireless client device via the stable device address within a second frame identifying the wireless client device via the first device address.

3. The method of claim 2, further comprising:
receiving a first frame identifying the wireless client device via the stable device address;
encapsulating the first frame within a second frame, the second frame identifying the wireless client device via the first device address; and
transmitting the second frame to the wireless client device.

4. The method of claim 3, wherein the first frame is in a first format, and wherein the second frame is generated in a second format that is different from the first format.

5. The method of claim 3, further comprising:
receiving, from the wireless client device, a third frame identifying the wireless client device via the first device address;
decoding the third frame to identify a fourth frame, the fourth frame identifying the wireless client device via the stable device address; and
forwarding the fourth frame over a data network.

6. The method of claim 5, wherein the third frame is decoded in conformance with a first format, and wherein the fourth frame complies with a second format that is different from the first format.

7. An apparatus comprising:
a network interface configured to enable network communications;
one or more processors; and
one or more memories storing instructions that when executed configure the one or more processors to perform operations comprising:
first associating with a wireless client device, the wireless client device identified via a first device address;
establishing, based on the first associating, a first secure communication channel with the wireless client device;
receiving, over the first secure communication channel, a first mapping of the first device address to a stable device address;
performing first data communication with the wireless client device based on the first mapping;
second associating with the wireless client device, the wireless client device identified via a second device address;
establishing a second secure communication channel with the wireless client device;
receiving, over the second secure communication channel, a second mapping of the second device address to the stable device address; and
performing second data communication with the wireless client device based on the second mapping,
wherein the first data communication and the second data communication are tunneled between an access point and the wireless client device, and
wherein a four-way handshake is performed between the wireless client device and the access point after each of the first associating and the second associating.

8. The apparatus of claim 7, the operations further comprising receiving from the wireless client device an action request frame that indicates the first mapping.

9. The apparatus of claim 8, wherein the action request frame is decoded to identify a request for tunneling of a first frame identifying the wireless client device via the stable device address within a second frame identifying the wireless client device via the first device address.

10. The apparatus of claim 9, the operations further comprising:
receiving a first frame identifying the wireless client device via the stable device address;
encapsulating the first frame within a second frame, the second frame identifying the wireless client device via the first device address; and
transmitting the second frame to the wireless client device.

11. The apparatus of claim 10, wherein the first frame is in a first format.

12. The apparatus of claim 11, wherein the second frame is generated in a second format that is different from the first format.

13. The apparatus of claim 10, the operations further comprising:
receiving, from the wireless client device, a third frame identifying the wireless client device via the first device address;
decoding the third frame to identify a fourth frame, the fourth frame identifying the wireless client device via the stable device address; and
forwarding the fourth frame over a data network.

14. The apparatus of claim 13, wherein the third frame is decoded in conformance with a first format, and wherein the fourth frame complies with a second format different from the first format.

15. A non-transitory computer readable storage medium comprising instructions that when executed configure one or more processors to perform operations comprising:

receiving, from a wireless client device, a first association request to associate to a wireless network, the wireless client device identified by the association request via a first device address;

rejecting, based on the first device address, the first association request;

transmitting, to the wireless client device, and based on the rejecting, a security association (SA)-query request message;

receiving, from the wireless client device, a SA-query response message;

decoding the SA-query response message to identify a mapping of the first device address to a stable device address;

storing the mapping;

receiving, from the wireless client device, a second association request, the wireless client device identified by the second association request via the first device address;

accepting, based on the stored mapping, the second association request; and tunneling data communication between an access point and the wireless client device, wherein a four-way handshake is performed between the wireless client device and the access point after each of the first associating and the second associating.

16. The non-transitory computer readable storage medium of claim 15, wherein the decoding of the SA-query response message comprises decoding an information element included in the SA-query response message, wherein the mapping is identified based on the decoding.

17. The non-transitory computer readable storage medium of claim 15, the operations further comprising searching, in response to the association request, a data store for a mapping identifying the first device address, wherein the rejecting is based on a failure of the searching to identify a mapping.

18. The non-transitory computer readable storage medium of claim 15, the operations further comprising exchanging data with the wireless client device based on the stored mapping.

19. The non-transitory computer readable storage medium of claim 15, the operations further comprising:

receiving a first frame identifying the wireless client device via the stable device address;

encapsulating the first frame inside a second frame that identifies the wireless client device via the first device address; and transmitting the second frame over a wireless network to the wireless client device.

20. The non-transitory computer readable storage medium of claim 19, further comprising decoding the first frame in accordance with a first packet format, wherein the encapsulating comprises generating the second frame in accordance with a second packet format different from the first format.

* * * * *